INVENTOR.
THOMAS B. REED
BY Edward D. Thomas
AGENT

United States Patent Office 3,324,334
Patented June 6, 1967

3,324,334
INDUCTION PLASMA TORCH WITH MEANS FOR RECIRCULATING THE PLASMA
Thomas B. Reed, Concord, Mass., assignor, by mesne assignments, to Massachusetts Institute of Technology, a corporation of Massachusetts
Continuation of application Ser. No. 106,308, Apr. 28, 1961. This application Mar. 15, 1966, Ser. No. 534,532
18 Claims. (Cl. 313—231)

This application is a continuation of Ser. No. 106,308, filed Apr. 28, 1961, now abandoned.

This invention relates to apparatus and a method for producing a thermal plasma without using electrodes by inductively heating a gas with high frequency electrical energy and for producing a plasma flame or jet by flowing gas through said plasma.

A thermal plasma, also called a "high pressure plasma," is a gas at a high enough temperature (generally above 5000° K.) to be luminous and electrically conducting, and at a high enough pressure (generally above 1/20 atmosphere) for the electrons, ions and atoms present to approach thermal equilibrium. These plasmas are conventionally formed in electric arcs. Recently, electric arcs have been modified to produce flames and jets of plasmas. These plasma flames and jets have shown great utility for welding and cutting metals, spraying metal and non-metal powders, high temperature chemical cracking and synthesis reactions, materials testing, re-entry simulation, and other processes where extremely high temperatures and entropy flows are useful.

The electrodes used in producing these plasma jets and flames are generally very well cooled, but in spite of this they are subject to chemical attack from certain gases such as air, electrical attack, and thermal attack from these very hot gases. Further, the cooling of the electrodes lowers the temperature of the plasmas produced. This also lowers the electrical efficiency of the electrode type plasma torches. Finally, the electrode plasma torches generally produce a high velocity gas jet (greater than 1000 feet per second) unsuitable for many applications.

In view of the above characteristics of electrode type plasma torches, it is an object of the present invention to provide a method and apparatus for generating a plasma and a plasma flame or jet that does not require electrodes so that any gas may be used since the plasma need contact only an electrically-insulating high-temperature material which is not susceptible to oxidation, reduction or corrosion.

Induction heating of electrically conductive materials is well known. Since gases are not sufficiently electrically conductive at low temperatures to be classified as conductors, induction heating has not been applied to heating gases. The method of the present invention achieves the object of an electrodeless plasma torch by using inductive heating of gases, and describes the problems inherent in starting, stabilizing and containing such a plasma.

Inductive discharges in gases at low pressure, generally less than 1/20 atmosphere, have been known since the work reported by Thompson, Philosophical Magazine, May 1891. These low pressure discharges are characterized by high average electron energies while the relatively few collisions give a low gas and ion temperature. These low pressure plasmas may be useful for lighting applications, but have little available heat and the problems of generating and maintaining these low pressure plasmas are distinct from those encountered with high pressure thermal plasmas. Babat, Institute of Electrical Engineers, Part III 94, 27 (1947) describes work with these low pressure inductive discharges and reported a transition to what may have been a thermal plasma as he increased pressure to one atmosphere. No attempt was made to flow gas through this discharge in order to make a plasma flame, and apparently the very high power levels required and the difficulty of starting discouraged future work. It is not certain that Babat's discharge was thermal, since I have also observed highly luminous but non-thermal discharges, even at atmospheric pressure. Similar "cold" discharges are also reported by Cobine, J. Appl. Phys. 22, 835 (1951), for another type of high frequency discharge based on dissociation of diatomic molecules into atoms. This dissociation is based on dielectric excitation of molecules, but does not result in ionization of the atoms. The temperatures measured in this type of torch range from 3000 to 6000° K. which is consistent with temperatures necessary for dissociation but are too low to produce significant ionization.

In practicing the method of the present invention, the problems to be overcome are those of initiation of the plasma, stabilization of the plasma, and containment of the plasma.

Before considering these problems in more detail, a brief description of the apparatus used to inductively heat a gas to a plasma is desirable. The basic apparatus consists of a cylinder containing static or flowing gas encircled by a high-frequency coil connected to a source of high-frequency energy. When the coil is energized, a plasma is produced in the gas and is heated by the field of said coil after starting conditions are established as described below. If gas is introduced at one end of the cylinder, it is heated as it passes through the plasma and emerges as a plasma flame at the other end.

Starting or initiation of the plasma in a high pressure gas is a procedure which generally requires more than an induction field. It is, of course, possible that the application of a high-intensity induction field could cause ionization by the electrical breakdown of the high pressure gas, but possible breakdown of the air surrounding the coil or puncture of the material of the cylinder containing the gas because of the large electric field strength makes this starting technique generally undesirable. I have started the plasma by use of a moderate field without other starting aids when the plasma had become extinguished after a period of operation. Presumably the plasma-heated cylinder heated the incoming gas sufficiently to allow unaided breakdown of the gas by the electric field. Normally, in order to produce the initial plasma with a moderate induction field, the state of the gas must be changed so that the field can couple sufficient energy into the gas to increase the ionization and conductivity and to subsequently produce a thermal plasma. This desirable starting-state of the gas can be obtained by introducing ions and electrons from an auxiliary source such as an electric arc, or by locally heating the gas in the induction field by introducing a small refractory rod which is heated by the field which provides a region for breakdown of the heated gas by the electric field. The apparatus for accomplishing these starting techniques is described in detail in the description of the figures which show various embodiments of the invention. It is also found that the plasma is most easily initiated in a gas of low thermal conductivity and low ionization potential such as argon or neon. Of course, enough power must be available from the generator to maintain the plasma after starting.

In order to have a torch which will produce a plasma flame and thus heat an object adjacent to the torch, it is necessary to have gas flow. For low gas flow velocities, there is no problem to maintaining the plasma within the induction field. However, unless special precautions are taken, as gas flow velocities increase the plasma will tend to move with the gas flow away from the center of the inductive field and eventually the plasma will be extinguished. In order to avoid extinguishing the plasma, a continuous supply of electrons and ions in the high field region of the induction field must be provided. This can be accomplished by creating counter-flowing gases or turbulence in the plasma. Apparatus for providing the re-establishment of the plasma and the process by which the apparatus accomplishes the stabilization of the plasma is contained in the detailed description of the figures.

In addition to the above discussed axial stabilization of the plasma, there is also the problem of radial or lateral containment, since increasing the power coupled to the plasma will tend to increase the volume of the plasma. The plasma is contained typically by a cylinder within the induction field produced by a coil, since otherwise the plasma will expand and short circuit the coil. The cylinder may consist of a high temperature or water cooled electrically non-conducting material, or may be the inner walls of the coil itself suitably protected from contacting the plasma. Because of the high temperature of the plasma, the containing cylinder must dissipate heat to the surrounding air by radiation or external cooling by air or water flow. At higher power levels, the flow of relatively cool gas along the inner surface of the cylinder serves a dual function. This gas flow not only cools the cylinder wall, but it also centers the plasma radially. Radial centering of the plasma is important for equal distribution of the heat to the containing walls and to avoid voltage breakdown in the high electric field region of the induction field which is more apt to occur as the plasma approaches the coil.

It is, therefore, a further object of this invention to provide apparatus and methods for starting, stabilizing, and containing a gaseous plasma flame.

Stated generally, the apparatus of the invention includes a means for confining the plasma, means for effecting flow of gas through and around said plasma, and means for supplying energy to said plasma by inductive coupling of high-frequency electrical energy. The apparatus further includes a means for initiating the plasma.

Figure 1:
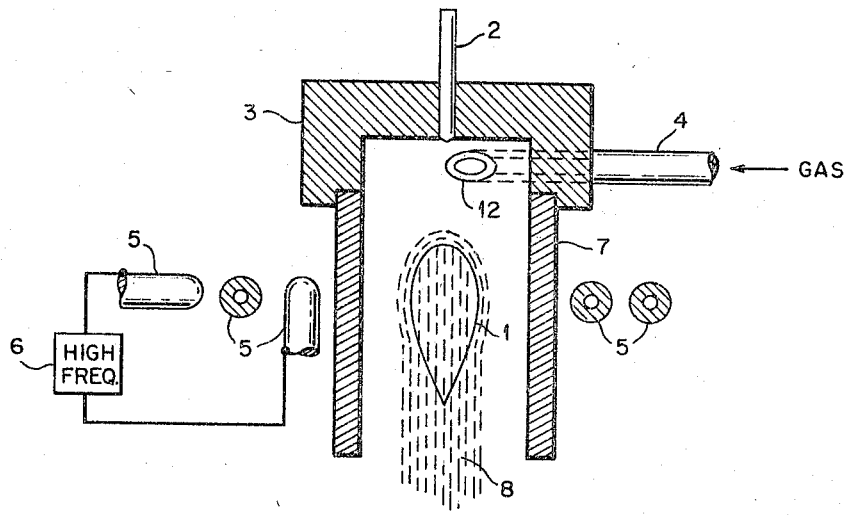
FIGURE 1 is a schematic view, primarily in vertical cross section of a preferred embodiment of the apparatus of the present invention.

FIGURE 1 shows a preferred embodiment of the plasma torch. Initiation of the plasma 1, the starting process, is possible typically by the use of an auxiliary source of ions or electrons or by heating the gas so that ionization thereof is easier in the presence of the high-frequency field produced by the coil 5 energized by a high frequency energy source 6. In FIGURE 1, starting is accomplished by heating the gas by a carbon rod 2, which is slidably mounted in end cap 3, positioned so that the end of the rod 2 is approximately in the plane of the coil 5. The energization of coil 5 by source 6 causes the end of the rod 2 to be heated, and the gas entering the chamber formed by end cap 3 and the cylindrical wall 7 through pipe 4 is raised in temperature by the heated carbon rod to a point where a gaseous discharge occurs. Typically, in the starting process a monatomic gas such as argon or neon which has a low ionization potential and low heat conductivity is preferred, although other gases may be used if higher strength fields are produced by energized coil 5. Once the plasma is established by the above process, the plasma region 1 and the gas-flame region 8 will continue to exist upon withdrawal of the end of carbon rod 2 into the region of end cap 3 if sufficient power is applied to coil 5 by source 6 and if the gas in the region of ionization has proper turbulence. In the apparatus of FIGURE 1, the proper type of turbulence to sustain the plasma is obtained typically by introducing the gas through tube 4 so that its flow is tangential to the inner surface of quartz tube 7. If the gas velocity is quite low (less than 20 ft./sec.) ordinary heat conduction will generate new electrons and ions in the incoming gas at the same rate as they are swept out by the flow of gas, and the plasma will remain in the plane of the coil 5. Therefore, for low gas velocity the way in which the gas enters the plasma region is not critical. At higher velocities, unless provision for regeneration of the plasma is made, it is possible to sweep the plasma 1 away from the field of coil 5, thereby extinguishing the plasma. Therefore, it is desirable to generate turbulence in the plasma region which causes a portion of the plasma to flow opposite to the main flow of the gas, thus continually reigniting the plasma. Such a turbulence may be generated by providing a vortex gas flow which has been found to produce a plasma which is stable to a degree such that increasing the gas flow causes the plasma 1 to move opposite the direction of the main flow of gas thereby causing a more stable plasma. In FIGURE 1, the gas is brought into the tube 7 tangentially through orifice 12 by tube 4 upstream of the plasma 1 and flows preferentially along the wall. This forms a low pressure region in the central region of tube 7 so that some of the gas flows locally upstream along the central axis of tube 7. Any such arrangement for providing this type of gas flow may be called reignition stabilization.

Another important feature of the present invention is the cooling of the wall 7. Since the plasma 1 is at a higher temperature than the tube wall 7, there will be heat flow to these walls and without some form of protection the wall will melt. At the lowest power levels, the tube wall 7 can dissipate the heat by convection to the surrounding air. At higher power levels, the wall 7 can be made of refractory materials and can also lose energy by radiation. Also at higher power levels a refractory tube wall such as quartz can be cooled by an external air blast or by water. At still higher powers, water cooled metal walls or internally water cooled walls are desirable. It is, of course, necessary to avoid having a short circuited turn by longitudinally slotting the metal wall. It is also found that the flow of gas along the wall under vortex flow prevents heat from reaching the wall.

The plasma torch of FIGURE 1 has been operated with a 1″ diameter quartz tube 7 with a five-run solenoid coil 5 of 3/16″ diameter water cooled copper tubing having a spacing of 5/16 inch between turns connected to a commercial (Lepel) 10 kw., 4 mc./sec. induction heating heating power source 6. However, it is observed experimentally that the plasma is equally stable and more easily visible, using a flat (pancake) five-turn coil 5. The power delivered to the plasma is approximately 50% of the input power to power source 6. The power required to be delivered by the source 6 depends upon the particular gas of the plasma and its rate of flow. The torch of FIGURE 1 has been started using argon after which the plasma has been sustained with mixtures of argon and as much as 20% $H_2$, 60% He, 60% air, or 100% oxygen. The minimum power capable of sustaining the plasma depends upon the particular gas mixture, with higher power being required for the diatomic gases and those with high heat conductivity. These percentage mixtures of gases with argon are to be considered as merely illustrative of mixtures which have been used and are not to be construed as limitations on the possible gas mixtures or the type of gases which may be used. The effluent gas flame 8 has been used to melt thorium oxide (melting point greater than 3300° C.) among other high melting point materials.

A typical set of data taken on the apparatus of FIGURE 1:

| | |
|---|---|
| Argon flow _____liters/min__ | 9.4 |
| Oxygen flow _____do____ | 2.8 |
| Peak plasma temperature _____deg. K.·10³__ | 18.9 |
| Average gas temperature _____deg. K.·10³__ | 8.5 |
| Power in effluent gas _____watts__ | 1140 |
| Power lost in radiation _____do____ | 610 |
| Power lost to wall _____do____ | 1330 |
| Total power to plasma _____do____ | 3080 |
| Estimated power to R.F. generator _____do____ | 6000 |

The heat transferred to the effluent gas was measured calorimetrically using an 8" length of water cooled copper rod with successively diminishing diameter holes sealed to the exit of the quartz tube. Radiation losses were measured by determining the rate of temperature rise in a brass hemi-cylinder six inches in diameter and 18" long which intercepted 0.46 of the plasma radiation. Finally, conduction losses to the wall were measured by flowing water along the outside of the quartz tube and measuring the flow rate and temperature rise of the water. The total energy transferred to the plasma was approximately 50% of the power supplied to energy source 6.

The temperature of the plasma was measured by photographically determining the intensity of radiation of certain spectral lines using the method applied to arcs by W. Lorenz, Z. Physik 129, 327–42 (1951) and extended by H. N. Olsen, Phys. Fluids 2, 619 (1959). Maximum plasma temperatures in the range 15,000° K. to 20,000° K. were measured, the maximum temperature being a function of the particular plasma gas and the power applied to the plasma is in a practical sense limited by the temperature and heat dissipation properties of the material from which the plasma containing tube 7 of FIGURES 1 and 2 or the tubes 34, 41 and 42 of FIGURE 3 is made.

Figure 2:
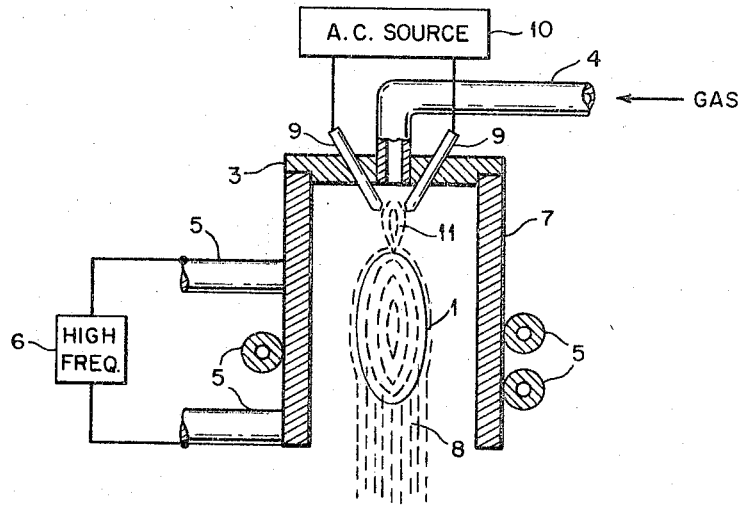
FIGURE 2 is another embodiment of the invention.

Another apparatus which can be used to initiate ionization in a gas is shown in FIGURE 2. Water-cooled tungsten electrodes 9 are energized by alternating current source 10 to provide a 60-cycle/sec. arc 11 typically of about thiry amperes. Gas flow from tube 4 into the arc 11 provides the source of ions and electrons upon which the coil 5 energized by high frequency source 6 may act to form the main plasma 1. Starting can also be accomplished by using a high energy spark source (not shown) to supply electrons and ions instead of arc 11.

In the apparatus of FIGURE 2, the incoming gas flow in pipe 4 through end cap 3 is substantially along the axis of tube 7 and may not provide the turbulence required to cause the plasma 1 to be self-sustaining for high gas velocity in the absence of arc 11. Therefore, operation of the apparatus of FIGURE 2 usually requires arc 11, thereby restricting the type gases which may be used because of destruction of the electrodes 9. However, if the gas is introduced tangentially as in FIGURE 1, the plasma 1, once established, will be self-sustaining and the arc 11 may be extinguished by removal of energy source 10 from electrodes 9.

Figure 3:
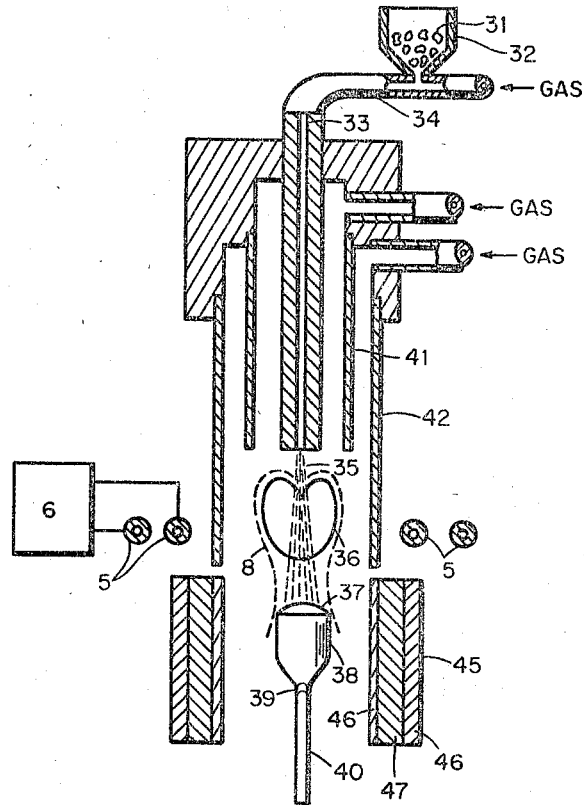
FIGURE 3 shows an embodiment of the invention adapted to the growth of crystals.

FIGURE 3 shows an induction plasma torch which has been designed for growing crystals. The material in powder form 31, in feed hopper 32, which is desired to be crystallized, is mixed with incoming gas in central tube 34. Those skilled in the art will recognize that a uniform powder feed can be obtained by using a vibratory spiral ramp feeder or a vibrating screen method for powder feed. The powder-gas mixture 35 is ejected from the longitudinal hole 33 of tube 34 into the thermal plasma 36 where the powder is heated and emerges to be deposited upon the molten surface 37 of the crystal 38 which has been grown by this process from the seed crystal 39 deposited on a refractory rod 40. The plasma 36 is established by using an easily ionizable gas such as argon in the tubes 34, 41, and 42. The rate of flow in the tubes is adjusted to provide the proper turbulence in the region occupied by plasma 36 to produce a self-sustaining plasma. Gas flows at high velocity between the tube 42 and the intermediate tube 41 to keep the outer tube 42 from melting and to create recircultion in the plasma region 36. Gas which flows at low velocity through the intermediate tube 41 forms the main body of the plasma 36. Finally, gas flowing at high velocity through the center tube 34 carries powder 31 through the plasma 36 to the molten cap 37 of the crystal 38. Insertion of a grounded carbon rod (not shown) into the region to be occupied by the plasma 36 causes the initiation of plasma when there is gas flow and high frequency energy supplied to coil 5 by energy source 6. If the gas flow rates in tubes 34, 41 and 42 are properly adjusted, the carbon rod may be removed after starting. For crystal growing purposes, the rates of gas flow must be adjusted to allow the powder-gas mixture 35 to flow through the plasma 36 and thus become heated while at the same time the gas flow in tubes 41 and 42 are adjusted to produce turbulenece in the plasma 36. Once the plasma has been started, the argon gas may be mixed with or replaced by other gases to provide a variety of atmospheres for crystal growth. A cylindrical heat shield 45 composed of materials such as alumina 46 and Fibrofrax 47 is used to reduce the rate of cooling of crystal 38 so that thermal stresses which could cause the crystal 38 to crack are reduced. Cooling of the tubes 34, 41 and 42 is provided primarily by the gas flow along the walls of said tubes.

The high temperatures which exist in the plasma 36 make possible the growth of crystals of very refractory materials. The torch of FIGURE 3 has been used to grow single crystals of stabilized zirconia, niobium, sapphire, nickel oxide and cobalt oxide. This list is intended to be merely illustrative of materials which may be fused in the torch even though single crystals may not be desired or obtained.

Figure 4:
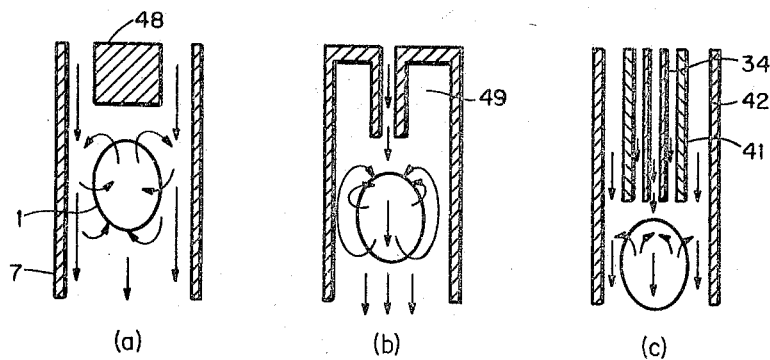
FIGURE 4 shows the approximate gas flow patterns for various embodiments of the invention.

Different techniques for obtaining the proper type turbulence to cause reignition of the plasma are shown in FIGURE 4. FIGURE 4a shows the gas flow pattern through the plasma 1 when the gas pressure along the walls of the cylinder 7 is higher than the pressure in the center of the cylinder. FIGURE 4a shows how an obstruction 48 can be used to cause the gas pressure to be greater at the walls than in a region under said obstruction. Introduction of gas tangentially to the wall of the cylinder as in FIGURE 1 also results in a gas flow pattern substantially as shown in FIGURE 4a. Another technique for producing gas turbulence is shown in FIGURE 4b. The lowered pressure in the region 49 causes a gas flow pattern of the type shown. FIGURE 4c shows the gas flow pattern obtained when the gas flow velocities are adjusted in accordance with the description of the operation of the apparatus of FIGURE 3.

The frequency of the high frequency source 6 is not critical but should be confined within rather broad limits. The high frequency limit is imposed in part by the occurrence of heating of the tube 7 surrounding the plasma by absorption of the high frequency energy. In addition, the skin depth of the plasma is a function of frequency in much the same manner as that of an ordinary conductor except for the fact that the plasma conductivity is not as well defined as that of a conductor. It has been experimentally found that when the frequency of the energy source is approximately 100 mc. the plasma assumes the shape of an annular ring of hot plasma which shape is attributed to the skin depth phenomena. The low frequency limit is primarily determined by the loss of efficiency as the skin depth exceeds the plasma thickness. I have found 4 mc. to be a convenient opertaing frequency.

It will be apparent to those skilled in the art that the basic apparatus of the present invention shown in FIGURES 1 through 3 may be modified by mechanical changes such as flaring out the output end of tube 7, by constricting the opening of tube 7 to form a nozzle to provide a smaller diameter plasma flame, by water cooling the tube 7, or by shaping the high frequency coil 5 so that maximum induction field concentration is achieved. It should be understood that modifications of this nature are within the scope of this invention.

The apparatus of the present invention has been described in detail for the configuration wherein the energizing coil 5 surrounds the cylinder 7. It has been found experimentally that once a plasma has been established, the coil 5 may be moved down the length of cylinder 7 until it no longer surrounds cylinder 7 without causing the plasma to be extinguished. It is expected that the plasma could be established initially with the coil 5 beyond the end of cylinder 7. Another possible arrangement of the coil 5 is one where it is positioned inside the cylinder 7.

What is claimed is:

1. The process of producing a thermal plasma flame in a gas at substantially atmospheric absolute pressure comprising the steps of, producing a high frequency electromagnetic field by energizing a coil from a high frequency energy source, causing a turbulent flow of gas in a tube along the axis of said coil through said field, initiating a thermal plasma by ionizing a portion of gas in said field, continuously recirculating ionized gas against said axial flow into said plasma region by the turbulence of said gas flow to maintain said plasma by the energy of said field, said gas flow being larger than that which will extinguish said plasma without recirculation, cooling the walls of said tube by said gas flow to stabilize the radial position of said plasma in said field.

2. A process as in claim 1 in which the step of initiating the thermal plasma comprises heating said gas by the insertion of an electrically conducting refractory rod into said electromagnetic field whereby said field causes said heated gas to ionize sufficiently to allow said field to produce a thermal plasma.

3. A process as in claim 1 in which said initiating of the thermal plasma comprises producing an arc discharge in said gas by the use of auxiliary electrodes in the vicinity of said high frequency electromagnetic field whereby the hot gas produced by said arc is energized by said field to produce a thermal plasma.

4. A process as in claim 3 comprising in addition extinguishing said arc and withdrawal of the electrodes from the vicinity of the plasma after establishment of said plasma.

5. A process as in claim 2 comprising in addition removing said rod after the thermal plasma has been established.

6. The process of producing a thermal plasma flame having a predetermined neutral, oxidizing or reducing atmosphere comprising the steps of, producing a high frequency electromagnetic field by energizing a coil from a high frequency energy source, causing a turbulent flow of argon gas at substantially atmospheric pressure in a tube along the axis of said coil, initiating a thermal plasma by ionizing a portion of the gas in said field, continuously supplying ionized gas to the region of said field by the turbulence of said gas flow to sustain said thermal plasma and stabilizing the radial position of said plasma in said field by the flow of said gas along the walls of said tube, and thereafter feeding a mixture of argon and a second gas into said tube and flowing said gas mixture through and around said plasma to produce a plasma flame having a velocity of at least 20 feet per second and an atmosphere determined by the nature and proportions of said second gas in said gas mixture.

7. An electrodeless plasma torch comprising a source of high frequency electrical energy, an induction coil connected to said source to establish a high frequency electromagnetic field within said coil, means for conducting a flowing stream of gas at an absolute pressure greater than $\frac{1}{20}$ of an atmosphere axially in said coil through a high intensity region of said field, means for initiating an electrical breakdown of said gas in said high intensity region so that the energy of said field produces a thermal plasma in said gas, and means controlling the flow of gas through said field to stabilize the axial position of said plasma within said field by causing a portion of the gas flow in the plasma to flow counter to the principal direction of gas flow, said gas flow being sufficiently large to cause the plasma to be extinguished without said stabilization.

8. A process for producing a thermal plasma flame in a gas at an absolute pressure greater than $\frac{1}{20}$ of an atmosphere which comprises initiating a thermal plasma in said gas, flowing gas through said plasma, sustaining said thermal plasma by applying a high frequency electromagnetic field to said plasma, partially enclosing the plasma with a relatively cool wall to constrain said plasma from expanding to the source of said field, recirculating a portion of said gas flow in the plasma region, said recirculation stabilizing the position of said plasma in the direction of the main gas flow to cause said plasma to remain in a region of high electromagnetic field and be sustained thereby, said gas flow velocity being sufficiently large to cause extinction of said plasma without said recirculation.

9. The process of claim 8 in which the gas flow velocity as it exists from said plasma is greater than 20 feet per second.

10. A process of providing a thermal plasma flame comprising supplying an easily ionizable monatomic gas at atmospheric pressure to one end of a cylinder to produce flow therethrough, heating said gas, applying a high frequency electromagnetic field to a region within said cylinder to ionize said gas to produce a thermal plasma, stabilizing said plasma by counter flowing ionized gas continuously to the plasma region of said field, and subsequently supplying a mixture of said monatomic gas and a diatomic gas to produce a higher energy thermal plasma while stabilizing said plasma, said gas flow velocity being greater than the velocity at which the plasma would be maintained in the absence of said counter-flowing gas, whereby a plasma flame is obtained at the other end of said cylinder.

11. An electrodeless plasma torch comprising a cylinder open at one end and containing an inlet at the other end, inlet means for supplying gas under absolute pressure greater than $\frac{1}{20}$ of an atmosphere through said inlet to cause a flow of gas through said cylinder toward said open end, means for impressing a high frequency electromagnetic field on said gas, means for initiating ionization of said gas within said cylinder, said field acting on said ionized gas to sustain a thermal plasma therein, said inlet means producing recirculation of ionized gas and axial stabilization of the plasma within said field, the gas velocity within said plasma being at least 20 feet per second.

12. The apparatus of claim 11 in which said inlet means comprises means for introducing said gas tangentially to the inner circumference of said cylinder.

13. The apparatus of claim 11 in which said inlet means comprises means for introducing said gas in a generally axial direction through a region of the end of said cylinder, said region being concentric with the circumference of said cylinder.

14. The apparatus of claim 11 in which said inlet means comprises at least one tube concentric with the circumference of said cylinder, means for providing a different velocity of gas flow in the tube than in the remainder of said cylinder, said tube terminating within said cylinder, said different velocity gas flows causing counter-flow of gas in the vicinity of the tube termination.

15. The apparatus according to claim 11 wherein said means for impressing a high frequency electromagnetic field comprises an induction coil, a source of high frequency electrical energy connected to said coil, said induction coil circumferentially enclosing a portion of the length of said cylinder whereby a high frequency electromagnetic field exists within said cylinder.

16. The apparatus according to claim 11 wherein said means for initiating ionization consists of an electrically conducting refractory rod located in the high-frequency electromagnetic field.

17. The apparatus according to claim 11 wherein said means for initiating ionization consists of an arc.

18. The apparatus according to claim 11 wherein said gas inlet is adapted to cause relatively cool gas to flow along the wall of said cylinder whereby the plasma is centered radially in said cylinder.

No references cited.

JAMES W. LAWRENCE, *Primary Examiner.*

S. A. SCHNEEBERGER, *Assistant Examiner.*